BEST AVAILABLE COPY

3 Sheets—Sheet 1.

G. M. PHELPS.

PRINTING TELEGRAPH.

No. 4,152. Reissued Oct. 11, 1870.

3 Sheets—Sheet 2.
G. M. PHELPS.
PRINTING TELEGRAPH.
No. 4,152. Reissued Oct. 11, 1870.
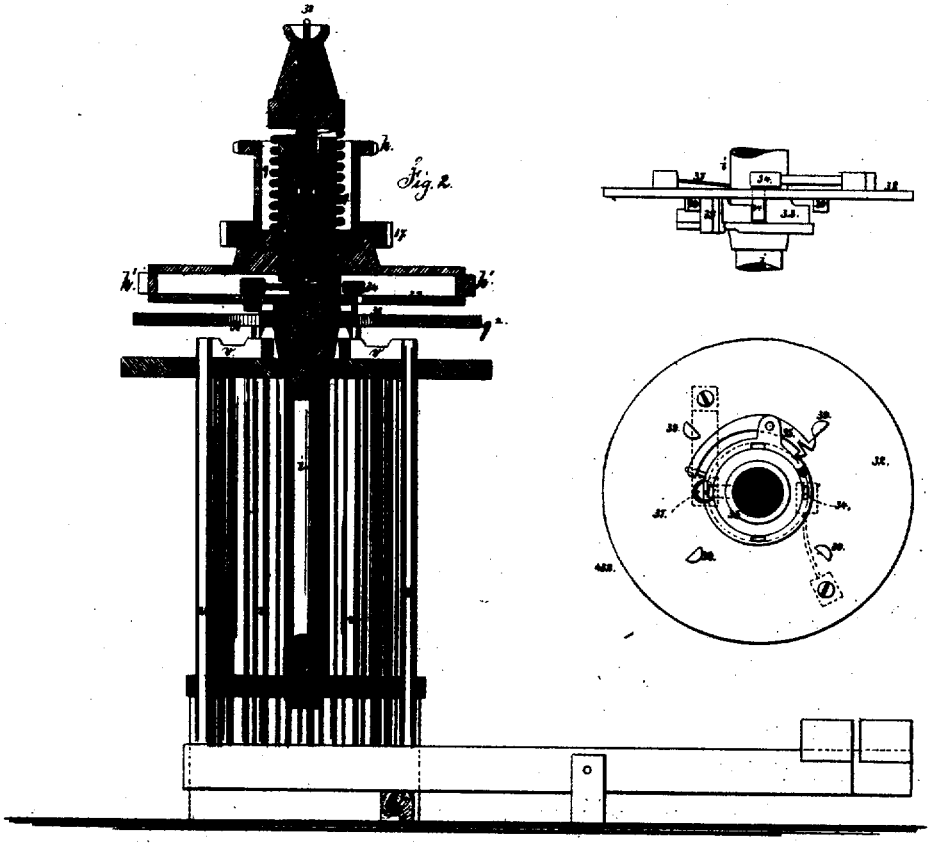
Fig. 2.
Fig. 8.
Fig. 7.
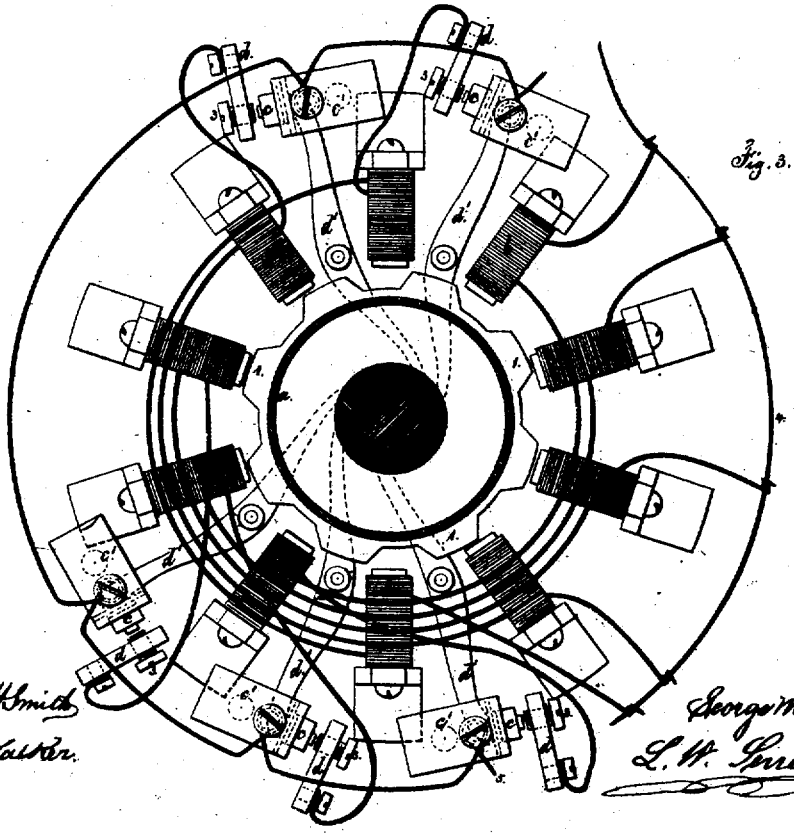
Fig. 3.
Witness
Chas. H. Smith
Geo. H. Walker.
George M. Phelps
L. W. Serrell atty.

3 Sheets—Sheet 3.

G. M. PHELPS.

PRINTING TELEGRAPH.

No. 4,152. Reissued Oct. 11, 1870.

Witnesses

Chas. H. Smith

Geo. D. Walker

George M. Phelps per L. W. Serrell

Att'y.

United States Patent Office.

GEORGE M. PHELPS, OF BROOKLYN, NEW YORK.

Letters Patent No. 89,887, dated May 11, 1869; reissue No. 4,152, dated October 11, 1870.

IMPROVEMENT IN PRINTING-TELEGRAPHS

The Schedule referred to in these Letters Patent and making part of the same.

*To all whom it may concern:*

Be it known that I, GEORGE M. PHELPS, of Brooklyn, in the county of Kings and State of New York, have invented and made a certain new and useful Improvement in Printing-Telegraphs; and I do hereby declare the following to be a full and correct description of said invention.

The object of this invention is—

First, to so adjust a magnetic motor that it shall run truly, to time with another machine, or several machines, in an electric circuit, and cause type-wheels, that are rotated by said motor, to revolve isochronously.

Second, to impress the desired letter when it reaches the point for the impression, and perform that impression in a given period, without the motor being checked in its revolution, thereby preventing loss or gain in the relative rotations of the respective type-wheels in the circuit; and Third, to stop the revolution of the type-wheel at the dash-key, or other given point, when the keys have not been used for a brief period of time; thereby all the type-wheels in the circuit are self-adjusting by the lapse of a few moments between the transmission of different messages, words, or letters.

In the drawing—

Figure 2 is a section through the type-wheel and actuating mechanism;

Figure 3 is a plan of the magnetic motor, at and below the line *x x*, fig. 4;

Figure 7 is an inverted plan of the plate 32; and

Figure 8 is a side view of the same.

Figure 1:
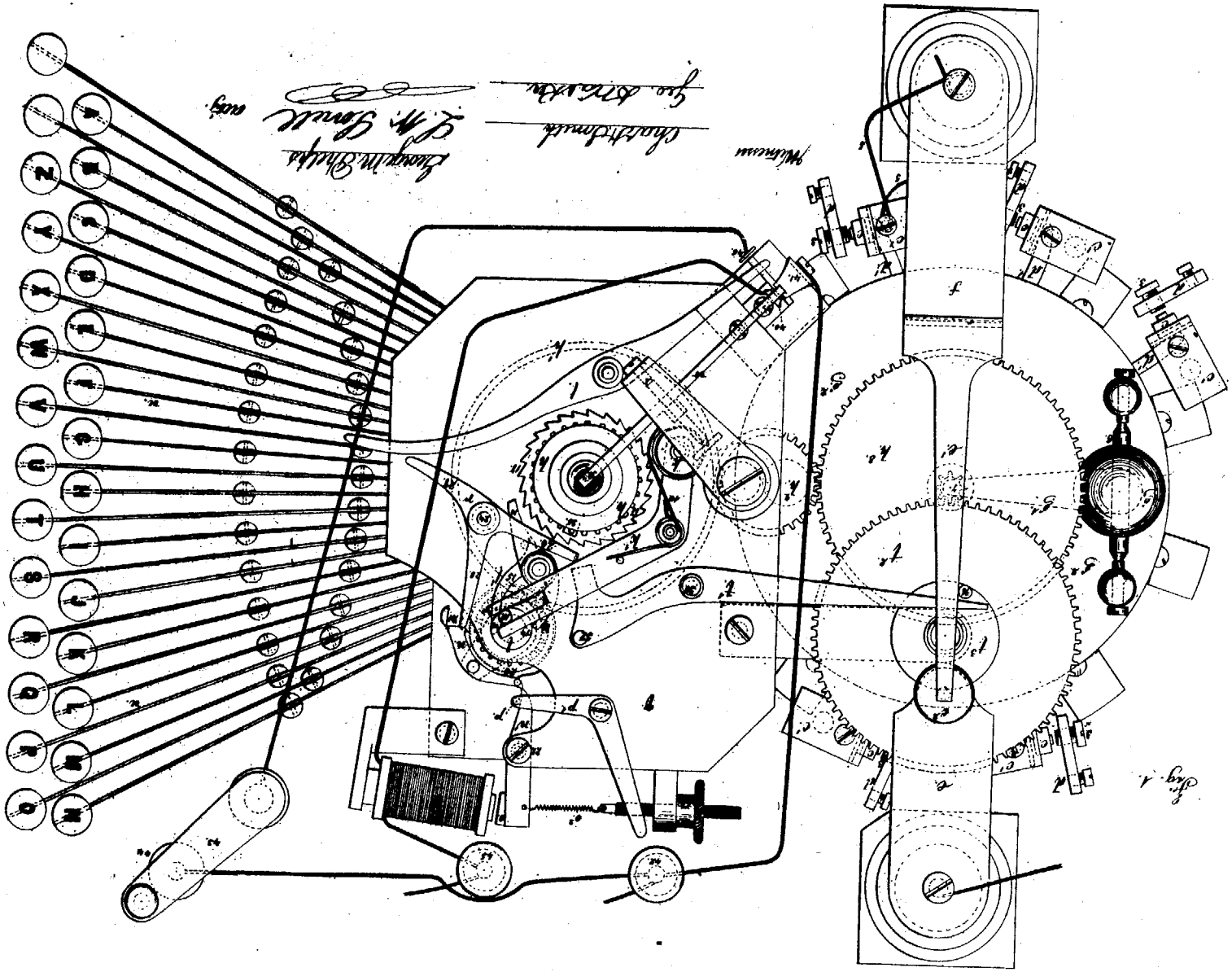
Figure 1 is a plan of said machine.

The motor which I employ is a rotary magnetic engine.

I make use of a hub, *a*, mounted on a shaft, *a'*, and having iron projections 1 1, which become armatures, to be attracted successively by the magnets *b b*, that are placed in a circular range around the hub *a*, and these magnets are more numerous than the projections 1 1.

I have shown eight of the latter, and ten of the magnets, so that the magnets shall act in succession as the armatures 1 1 come within their influence, and I arrange the connections and circuit-closers so that the magnet shall be charged as the armature is approaching, (in the revolution of the hub,) and then the circuit is broken just as the armature comes opposite the magnet.

By this means a constant attraction is operating to draw the hub *a* and shaft *a'* around, so as to revolve them, and that with whatever speed the instrument may be adjusted to.

I connect the magnets *b b* in pairs, at opposite sides of the circular ranges, so as to require only half the number of circuit-closers, and balance the actions of the magnets.

Each circuit-closer is formed by a spring, *c*, hanging from a standard, *c'*, and formed as a fork.

One end of the fork carries a finger, 2, that allows only a limited movement to the other fork of the spring.

*d* is the standard and clamp for the magnet-wire, carrying an adjustable screw, 3, to take the spring *c*; and

*d'* is a lever, that is acted upon at the right time by one of a series of cam-projections around the shaft *a'*, and presses the spring *c* into contact with the screw 3, to close the circuit, and the said projection, moving past the lever *d'*, allows the spring to draw back from 3, and break the circuit.

One of the battery-wires, 4, is connected with the magnets on the opposite sides of the circular range to the circuit-closers.

The other battery-wire comes to the plate *e*, thence by the adjusting-screw $e^2$, spring arm $e^1$, plate *f*, and wire 5, to the standards *c'*, so that the electricity passes successively through the pairs of magnets, causing the motor *a a'* to revolve.

The governor of the motor is made of a ball, *g*, with an arm $g^1$, set on a fulcrum, 6, that is supported by the plate $g^2$, and the arm $g^1$ enters, at its end, an opening in the side of the shaft *a'*, and acts upon a vertical pin, 7, that is contained loosely and axially therein, and this pin 7 comes up under the spring arm $e^1$. If, therefore, the speed of the instrument increases, the ball *g* will cause the lever arm $q^1$ to lift the spring arm $e^1$, and break the circuit through the screw $e^2$, and thereby check the speed, and, by adjusting this screw $e^2$, the two or more machines in an electric circuit can be made to revolve at uniform speed.

The type-wheel *h* is revolved by gear-wheels $h^1$ $h^2$ $h^3$, from the shaft *a'*.

The wheel $h^1$ is affixed firmly to the shaft *i*, but the type-wheel is caused to revolve with the shaft *i*, by the friction-surface at *h*, kept together by the spring and screw at 9.

The impression-roller *k* is mounted upon a bent lever *k'*.

10 is a spring guide for the paper.

11 is a spring pawl, to rotate the roller *k*, as the roller is moved back from the type-wheel *h*.

The impression is produced by the revolution of the crank-pin 12, in a slot in the lever *k'*. The same movement first stops and then releases the type-wheel.

It is to be understood that the type-wheel revolves continually with the electro-motor except when stopped.

In the shaft $l$ that carries a crank-pin, 12, is a notch, 13, on one side, and a projection, 14, on the other side, as seen in fig. 1; and $l'$ is an escapement and pawl, the arm 15 being a stud, to be thrown into the notch 13, at the time the pawl 16 is thrown out of the ratchet-teeth 17, around the base of the sleeve of the type-wheel $h$, and the arm 19, acted upon by the projection 14, insures the movement of throwing the pawl 16 out of the teeth 17, there being a spring applied between the arm 15 and pawl 16, to prevent injury to the pawl in taking the ratchet-teeth.

The normal position of the machine is with the pawl 16 clear of the teeth 17, but the moment the shaft $l$ begins to revolve, by the means hereafter described, the pawl 16 is thrown into the teeth 17, and holds the type-wheel while the impression is being made, the completion of the revolution of $l$ again liberating the wheel $h$.

The wheel $h^1$ and shaft $l$ continue to revolve even when the type-wheel is stopped, and the pinion $m$ also revolves by the wheel $h^1$.

Figure 5:
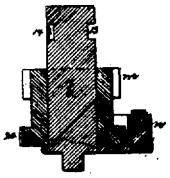
Figure 5 is a section through the shaft *l*.
Figure 4:
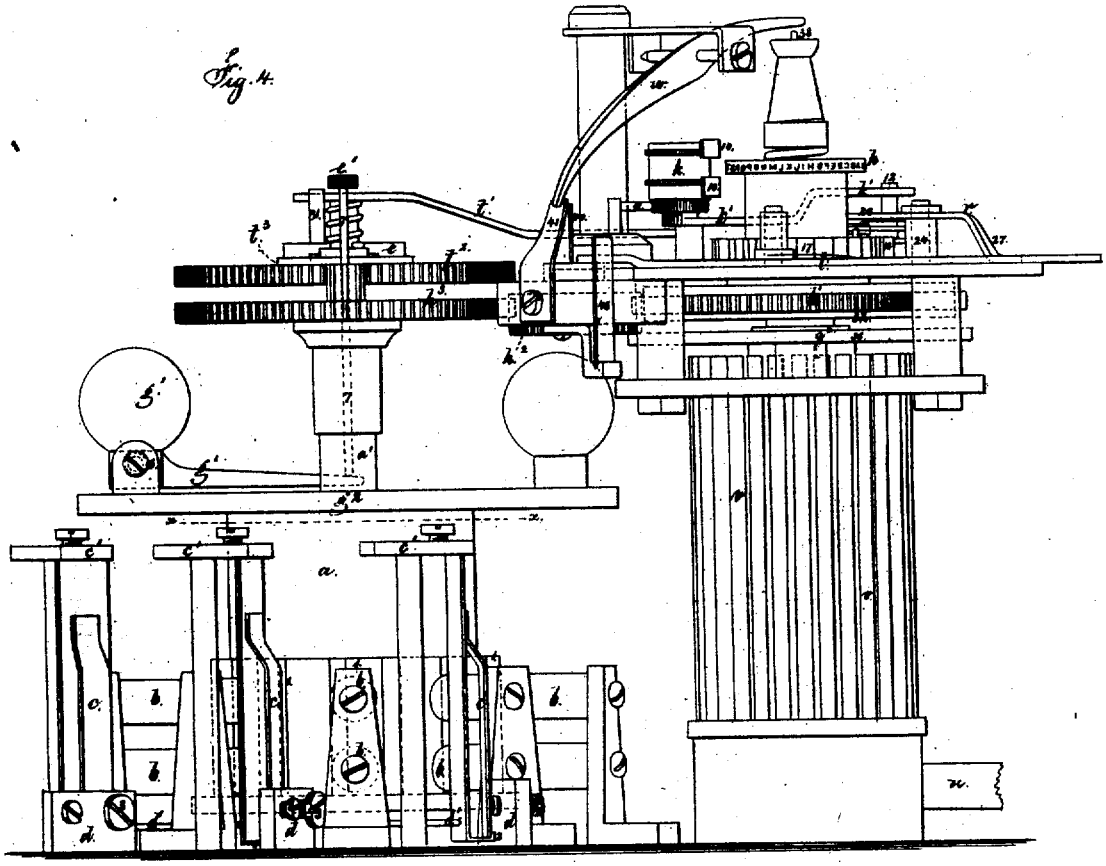
Figure 4 is a side elevation of the machine.

The pinion $m$ is on a sleeve that surrounds the shaft $l$, and a fine ratchet-wheel, 20, is also on the sleeve of $m$, (see fig. 5.)

$n$ is a spring pawl upon an arm that projects from the lower part of the shaft $l$, and hence, when the pawl $n$ is in gear with the teeth of the ratchet 20, the shaft $l$ will be revolved by the pinion $m$ and motor.

The normal condition, however, of the parts, is that shown in fig. 1, where the head of the pawl $n$ is stopped against the stud 21, and the pawl thrown out of gear with 20, by the blocking-lever $n'$, that is mounted upon the fulcrum 22, and carries, at the other end, the armature $o$, opposite the magnets $o^1$.

It will now be understood that the printing is effected by charging the magnets $o^1$ so as to swing the blocking-lever $n'$ clear of the tail of the pawl $n$, and allow the spring of the pawl to move the end thereof off the stud 21, and throw the pawl into gear for carrying the shaft $l$ around, and effecting the movements before detailed, and an impression would be made each revolution of the shaft $l$, were it not that the current is instantly broken to the magnet $o^1$, and the spring $o^2$ draws the lever $n'$ into the normal position to throw the pawl $n$ out of gear with 20, and cause the shaft $l$ to be stopped by the pawl $n$ coming against the stud 21.

I here remark that a finger, $p$, upon a lever, $p'$, on the plate $q$, may be used to block the pawl $n$, and prevent its moving even when the magnet $o^1$ is charged. This lever $p'$ serves to stop the printing-portion of the instrument, when the keys are being used for transmitting.

I make use of a three-armed stop, $r$, on a fulcrum, 24. One arm, 26, takes a stud, 25, on the sleeve of the type-wheel $h$; the other arm, 27, is acted upon by the circuit-lever $t$, hereafter described, to cause the end 26 to take the stop 25; and the third arm, 28, is acted upon by the block 15, to disconnect 25 and 26, as the shaft $l$ commences to revolve.

I make use of a mechanism driven by the electro-motor to throw the stop 26 back, so as to take the stop 25, and arrest the movement of the type-wheel, if the keys are left a short time out of action, and thereby all the type-wheels in motion in the telegraph-circuit are stopped at the correct place for being brought into action again, and the loss or gain of a letter, from slight differences in the electro-motors, is prevented.

The lever $t^1$ is on the fulcrum 30, and extends to the wheel $t^2$, that is driven by a small pinion on $a'$, and 31 is a stud extending up from the friction-plate, $t^3$.

This plate $t^3$ and stud 31 move one end of the lever $t^1$; the other end of said lever $t^1$ presses the arm 26 back into position to stop the stud 25, and, when the printing mechanism is again started, the lever $k^1$, acting upon the stud 52 of the lever $t^1$, returns that and the friction-plate $t^3$ to their normal positions.

The mechanism for stopping the type-wheel, and giving the impression by magnetism, having been described, I will now set forth the mechanism for directing the electric current.

That current, by the connections of the wires being properly made, passes through the transmitting instrument, and through the magnet $o^1$ of the receiving instrument, or the same may actuate a local circuit to said magnets by means of a relay magnet.

Figure 6:
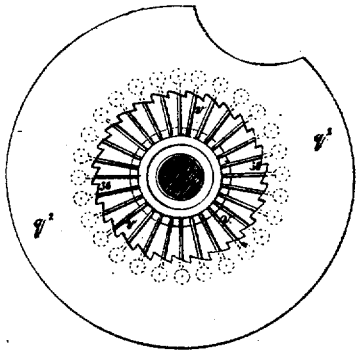
Figure 6 is a plan of the plate $q^2$ and slides *v*.

I provide a range of finger-keys or levers, $u$, with any desired character of keys or finger-pieces, and these are placed so that they converge to the respective slides $v$ that are placed vertically in a circular range, so that the depression of any one key throws up its corresponding slide $v$, and a small slide-plate that forms the upper end of said slide $v$. These, to insure compactness, are brought into a smaller-sized circle, as seen in fig. 6.

Around the shaft $i$ of the type-wheel $h$ is a disk, 32, fastened thereon, and below this is a collar, 33, that turns loosely thereon.

In the edge of this collar 33 are notches, (I prefer, and have shown four; they are beveled,) and 34 is a spring pawl, entering one of these notches, and forming the friction necessary to revolve it with the shaft $i$, but allowing the collar to stand still while the disk 32 continues to revolve.

On the edge of this collar 33 is a pawl, 35, (see figs. 7 and 8,) the outer edge of which, when in a normal position, revolves free of the internal ratchet-teeth 36 of the plate $q^2$ that are stationary. The lower edge of this collar 33 is formed as a flange directly above the ends of the slides $v$, having a notch or incline cut into it.

When one of the finger-keys is depressed, the end of the slide $v$ cannot rise until, by the rotation of the disk 32 and collar 33, the notch comes over said end of $v$, and said end of $v$ goes up instantly, and in front of the inclined end of the pawl 35, throwing that out laterally into the teeth 36; stopping the movement of the collar 33; and, as the disk 32 continues to revolve, a spring pusher, 37, that, in a normal position, rests upon the depressed portion of the upper edge of the collar 33, is raised as it revolves over said collar. This causes the pin 38, that occupies the center of the shaft $i$, to ascend momentarily.

The further movement of the disk 32 releases the pawl 35 from the teeth 36 by the inclined stud 39 running against it; at the same moment the pusher 37 again passes down into the next depression on the upper surface of 33, lowering the pin 38, and the spring pawl 34 falls into the next notch that presents itself, and the parts resume their normal position and revolve with the shaft and type-wheel.

I remark that there is to be the same number of studs 39 as there are notches for the spring pawl 34, and the shaft $l$ must be revolved accordingly, so that there can be an impression given during the pause of the collar 33, or nearly so.

In the drawing this pause is a quarter revolution of the shaft $i$ and wheel $h$, the shaft $l$ making a complete revolution in the same time.

The endwise movement of the pin 38 connects the circuit to the magnet $o^1$ momentarily, and then breaks it again, so that the armature $o$, being attracted, releases the stop $n'$, and causes the shaft $l$ to revolve as before described, to give the impression.

The lever $w$ extends from the pin 38 to the circuit closer, formed of the springs 40 and 41.

The binding-screw 42 is connected with the spring 41, and the spring 40 is connected with the circuit-closer 46, and wire to the switch 43, the anvil 44 of which switch is connected to the binding screw 42.

The magnet $o^1$ is connected to the binding-screw 45, and thence to the spring circuit-closer 40.

At the receiving-station the magnet $o^1$ is in the circuit through 45, $o^1$, 40 46 43 44 42, and this circuit 40 and 41 being open, can be broken, if the printing is not correct, by the hand-lever $t$ separating the circuit-breaker 40 and 46, so as to have the message repeated correctly.

At the transmitting-station the switch 43 44 is opened, and the circuit is through 42, 41, 40, $o^1$, and 45, the pulsations being produced by the opening and closing of the circuit at 40 41 by the means aforesaid, that act in time with the type-wheel.

The lever $t$ being moved to break the circuit at the receiving-station, in case of error in the message as printed, causes the point 26 of the lever $r$ to engage the stud 25, and stop the type-wheel at the given "dash-point," so that, when the circuit is again closed, the type-wheel will be correctly adjusted relatively to the keys and movements at the transmitting-station, so that the operator sending the message, seeing that the circuit is broken, will commence repeating as soon as the circuit is closed at the receiving end by relieving the lever $t$.

In my machine I am enabled to print consecutive letters by stopping the type-wheel a certain length of time for the printing of each letter, and the type-wheel moves more rapidly between the letters than heretofore in "single wave" instruments; hence, there is a lengthening of the breaking and closing of the electric circuit, with an equal speed of transmission.

I do not claim a stop applied to a type-wheel, to arrest its movement at the zero or dash-point; nor do I claim a stop actuated by the printing mechanism, so that, when liberated, the type-wheel is allowed to move to the stop at the zero point, as these are found in the English Patent No. 12,039, of E. & H. Highton, granted in 1848. Nor do I claim a stop or unison lever operated by hand, as in the printing-telegraph known as the "Combination Instrument."

I claim as my invention—

1. The type-wheel, rotated by means of a rotary magnetic motor, applied to a shaft that is connected with the type-wheel, substantially as set forth.

2. The adjustable circuit-breaker and centrifugal governor, in combination with an electro-magnetic motor, substantially as specified.

3. The mechanism, substantially as set forth, for giving an impression upon the type-wheel by the lever $k'$, and type-wheel actuated by the revolution of the shaft $l$.

4. The mechanism, substantially as specified, for closing and breaking the circuit to an electro-magnet, in combination with mechanism for effecting the impression, and stopping and liberating the type-wheel, the type-wheel and circuit-closing mechanism being detained the same integral portion of a revolution as the actuating-shaft, substantially as set forth.

5. The slides $v$, collar 33, and mechanism, substantially as set forth, for directing the current of electricity to the magnet $o^1$, as set forth.

6. The combination of the circuit-breaking lever $t$ with the locking-lever and type-wheel, substantially as described.

7. The lever $t^1$ and friction-plate $t^2$, in combination with the stops 25 and 26, and type-wheel, substantially as and for the purposes set forth.

8. A type-wheel, having a progressive movement in one direction, and arrested at a given integral portion of a revolution of a motor, while the printing is being effected, so that more time is allowed for the action of the magnets, substantially as specified.

9. A type-wheel and its motor, in combination with a unison stop that receives its movement, for locking the type-wheel, from the parts that move the type-wheel, substantially as set forth.

10. A type-wheel, revolved in one direction, in combination with a stop that arrests the movement of the type-wheel at a zero or dash-point, and a connection from such stop to the printing mechanism that withdraws the said stop, to allow the type-wheel to proceed in its movement when the printing mechanism is actuated, substantially as specified.

Dated August 31, A. D. 1870.

G. M. PHELPS.

Witnesses:
GEO. D. WALKER,
CHAS. H. SMITH.